(12) United States Patent
Carmi

(10) Patent No.: US 8,469,558 B2
(45) Date of Patent: Jun. 25, 2013

(54) MULTI-FUNCTION LIGHT SOURCE

(75) Inventor: Doron Carmi, Hadar Am (IL)

(73) Assignee: Angelight Ltd., Tel Aviv (IL)

( * ) Notice: Subject to any disclaimer, the term of this patent is extended or adjusted under 35 U.S.C. 154(b) by 956 days.

(21) Appl. No.: 11/885,525

(22) PCT Filed: Mar. 1, 2006

(86) PCT No.: PCT/IL2006/000283
§ 371 (c)(1),
(2), (4) Date: Aug. 31, 2007

(87) PCT Pub. No.: WO2006/092794
PCT Pub. Date: Sep. 8, 2006

(65) Prior Publication Data
US 2008/0165550 A1    Jul. 10, 2008

Related U.S. Application Data

(60) Provisional application No. 60/656,898, filed on Mar. 1, 2005.

(51) Int. Cl.
*B60Q 1/06* (2006.01)
*F21V 21/26* (2006.01)
(52) U.S. Cl.
USPC ........... 362/386; 362/269; 362/286; 362/287; 362/419; 362/428
(58) Field of Classification Search
USPC ............... 362/183, 276, 286–287, 386, 399, 362/523, 526, 384, 411, 419, 428, 467–468, 362/508, 512–513, 199, 191, 269–271
See application file for complete search history.

(56) References Cited

U.S. PATENT DOCUMENTS

| | | | | |
|---|---|---|---|---|
| 5,072,347 A | * | 12/1991 | Brunson | 362/194 |
| 5,276,596 A | * | 1/1994 | Krenzel | 362/191 |
| 5,461,551 A | * | 10/1995 | Clayton | 362/183 |
| 5,490,046 A | * | 2/1996 | Gohl et al. | 362/35 |
| 5,589,901 A | * | 12/1996 | Means | 396/12 |
| 5,673,989 A | * | 10/1997 | Gohl et al. | 362/35 |
| 6,048,085 A | | 4/2000 | Turner | |
| 6,357,893 B1 | * | 3/2002 | Belliveau | 362/285 |
| 6,416,195 B1 | * | 7/2002 | Lin | 362/35 |

(Continued)

OTHER PUBLICATIONS

Golight, http//golight.com/products/profiler_II.html, pp. 1-3.

(Continued)

*Primary Examiner* — Sean Gramling
(74) *Attorney, Agent, or Firm* — Nath, Goldberg & Meyer; Jerald L. Meyer; Scott C. Langford

(57) ABSTRACT

A light source assembly (10) includes a light source (12) and a base (14) to which the light source is detachably attachable. The base is adapted to orient the light source to a plurality of positions when the light source is mounted thereon. The light source comprises a battery mounted therein for providing power thereto, at least when the light source is disconnected therefrom. The base is also adapted for being powered by the battery and/or by an alternative power source. The light source is adapted to be operational both when mounted on the base and when disconnected therefrom. The light source assembly may further comprise a mounting plate for attachment thereof, for example, to a building or an external surface of a vehicle.

26 Claims, 14 Drawing Sheets

U.S. PATENT DOCUMENTS

| | | | |
|---|---|---|---|
| 6,439,738 B1 * | 8/2002 | Matthews et al. | 362/194 |
| 6,550,932 B2 | 4/2003 | Poon | |
| 6,565,241 B1 | 5/2003 | Glynn | |
| 7,553,051 B2 * | 6/2009 | Brass et al. | 362/373 |
| 2006/0146527 A1 * | 7/2006 | VanderSchuit | 362/228 |

OTHER PUBLICATIONS

MBA-3800 Remote Control Rooftop Enclosure, http//peak.com/docs/peak_beam_brochure_2005.pdf, p. 1.

* cited by examiner

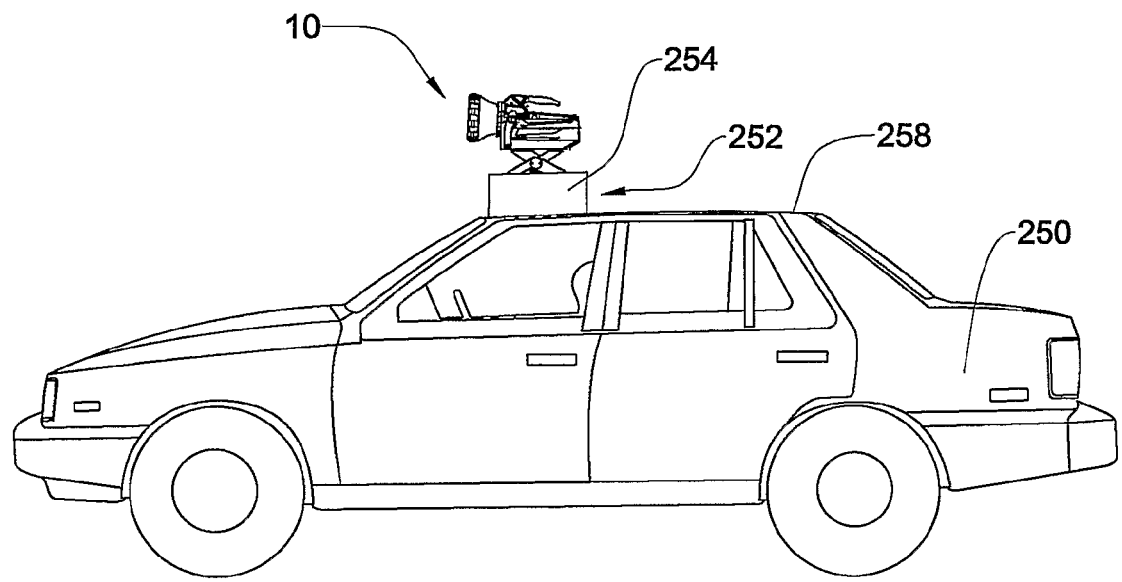
FIG. 9
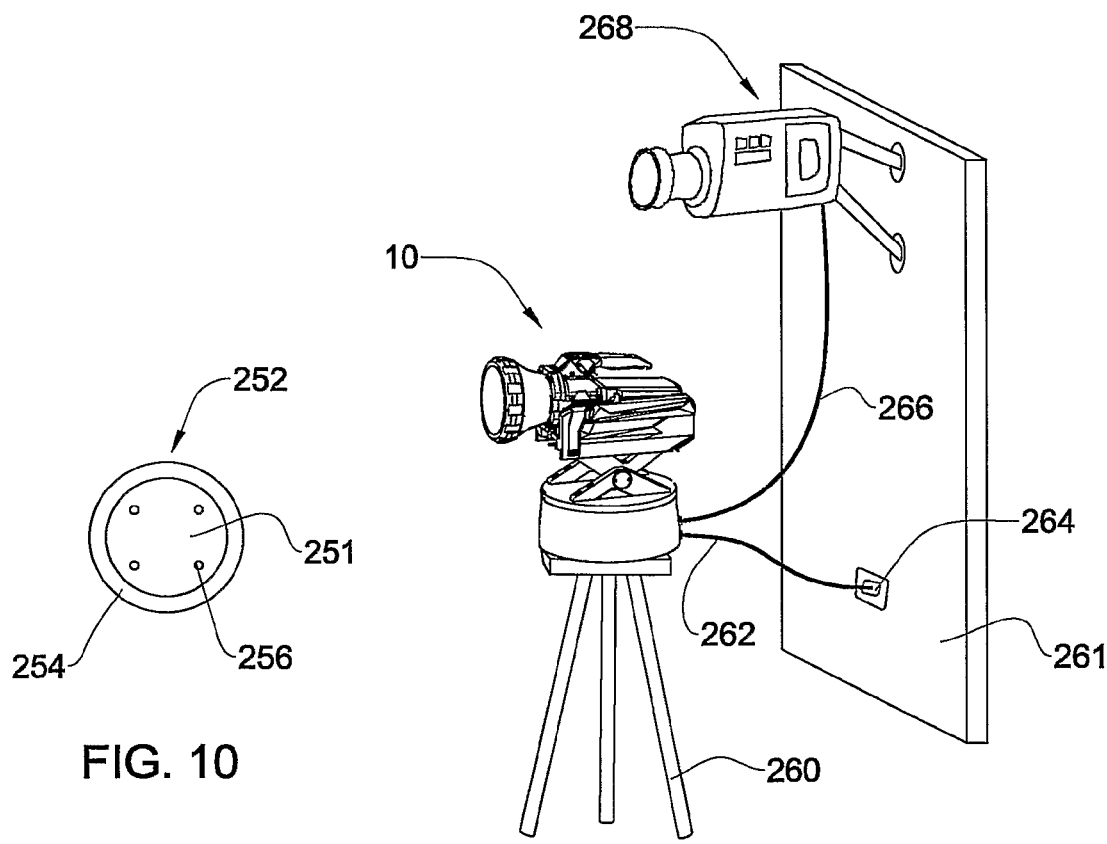
FIG. 10
FIG. 11

MULTI-FUNCTION LIGHT SOURCE

CROSS-REFERENCE

This is a National Phase Application filed under 35 U.S.C. 371 of International Application No. PCT/IL2006/000283, filed Mar. 1, 2006, claimed the benefit under 35 USC 119(e) of U.S. Provisional Application No. 60/656,898, filed Mar. 1, 2005, the entire contents of each of which is hereby incorporated herein by reference in its entirety.

FIELD OF THE INVENTION

This invention relates to light sources such as flashlights and searchlights and particularly to searchlights which comprise a base for orientation thereof.

BACKGROUND OF THE INVENTION

Flashlights, also known as torches, are portable light sources normally powered by batteries disposed therein. Flashlights may be used for locating objects in a dark area but are also commonly used for a variety of other purposes, such as providing light during an electrical blackout or to navigation a dark route. The batteries may be removed from the flashlight and charged by a battery charger or a flashlight may be adapted to facilitate recharging of batteries contained therein by placement of the flashlight in a cradle or charging base connected to a power source. One flashlight of this kind is disclosed, for example, in U.S. Pat. No. 6,550,932, where it is suggested that the flashlight may also be remotely controlled.

To enhance their portability flashlights are often designed to be extremely small so as to be carried with a minimum of effort and discomfort. Flashlights can also be found in larger more powerful models such as a "Maglite" which includes large batteries for sustained high intensity output and can serve as useful personal equipment for professionals such as search and rescue personnel and security forces who may use it for searching purposes and even as a baton, in a dangerous situation. Additionally, more powerful flashlights such as High Intensity Discharge (HID) or Xenon Short Arc may be found nowadays to provide stronger beams than that found in a "Maglite" or similar product.

Searchlights are light sources which, unlike flashlights, are primarily adapted to search for distant items by lighting dark and/or unclear areas. To lighten distant areas searchlights typically emit light beams of far higher intensity than flashlights, often consuming large quantities of power. To provide the necessary power, searchlights are therefore connected to power sources more powerful and larger than those used in connection with flashlights, such as a building's power outlet or a vehicle battery.

Therefore, searchlights generally differ from flashlights in that they are generally capable of lighting objects at greater distances but are normally not adapted for carrying due to their significant weight and power needs.

U.S. Pat. No. 5,673,989 discloses a searchlight including a mounting plate mountable on an external surface of a vehicle, and a light source assembly detachably mounted thereon. The assembly includes a light source and a base integrally assembled therewith so as to allow the light source to be movable relative to the base. The light source assembly is powered by the vehicle to which its mounting plate is attached, and is not operable when disconnected from the vehicle.

SUMMARY OF THE INVENTION

In accordance with one aspect of the present invention, there is provided a light source assembly including a light source and a base to which the light source is detachably attachable, the base being adapted to orient the light source to a plurality of positions when the light source is mounted thereon, the light source comprising a battery mounted therein, for providing power thereto at least when the light source is disconnected therefrom, the base being adapted for being powered by said battery and/or by an alternative power source, whereby the light source is adapted to be operational both when mounted on the base and when disconnected therefrom.

In accordance with another aspect of the invention, the light source assembly includes a mounting plate and said base is adapted for being detachable attachable to said plate. The assembly may also include a light source locking mechanism, to lock the light source in its position on the base, and a base locking mechanism to lock the base in its position on the mounting plate.

In accordance with a further aspect of the invention, the above mounting plate is adapted for mounting on a vehicle and said external power source is that of the vehicle.

In accordance with a still further aspect of the invention, there is also provided a vehicle with the mounting plate mounted thereon, and the light source assembly detachably attachable thereto. The vehicle may, for example, be such a land vehicle, aircraft, or marine vehicle.

In accordance with another aspect of the present invention, the light source assembly may have an arrangement for the battery in the light source to be charged by an external power source. In this case, the assembly comprises a charging circuit with a socket for receiving power from the external power source, the socket being disposed either in the base or in the light source. In both cases, the socket may be provided with a protecting assembly to allow its protection from the environment when the light source assembly is disconnected from the alternative source. The light source assembly may further include a feeding circuit to power the light source assembly directly from the alternative source, without the use of the battery. The assembly may further include a switch to select between two modes of powering, the charging and feeding modes, using respectively the charging and feeding circuits. The assembly further may comprise a transformer to provide to the charging and feeding circuits different voltages, as needed.

In accordance with a still further aspect of the invention, the base may be powered by said battery to move the light source into said plurality of positions, when the light source assembly is disconnected from any alternative source.

The light source assembly may further be adapted for use with a video camera, and may have an input to receive control signals therefrom for the base to move the light source in accordance with said signals, e.g. to orient the light source in the same direction as the camera.

The light source may typically include a reflector with an aperture and a light bulb mounted in the aperture, and it may be of any type suitable for use in searchlights. In one embodiment of the invention, the light source is a HID (high intensity discharge) source or a Xenon Short Arc source. In case the bulb has a non-circular circumferential shape, the reflector's aperture may have a shape to suit that of the bulb.

The battery in the light source assembly may be of any type suitable to provide power to a searchlight. In one embodiment of the invention, the battery is a lithium battery which may be used with a heating element disposed adjacent thereto.

The light source assembly have be adapted for remote control both when mounted on the mounting plate, e.g. on a vehicle, and when detached therefrom.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 9 is a schematic view of the light source assembly shown in FIG. 7, further comprising a mounting plate attached to a vehicle;

FIG. 10 is a schematic view of the mounting plate of the assembly shown in FIG. 9;

FIG. 11 illustrates an alternative use of the light source assembly shown in FIG. 7, mounted on a tripod and connected to a video camera.

DETAILED DESCRIPTION OF EXEMPLARY EMBODIMENTS

Figure 1:
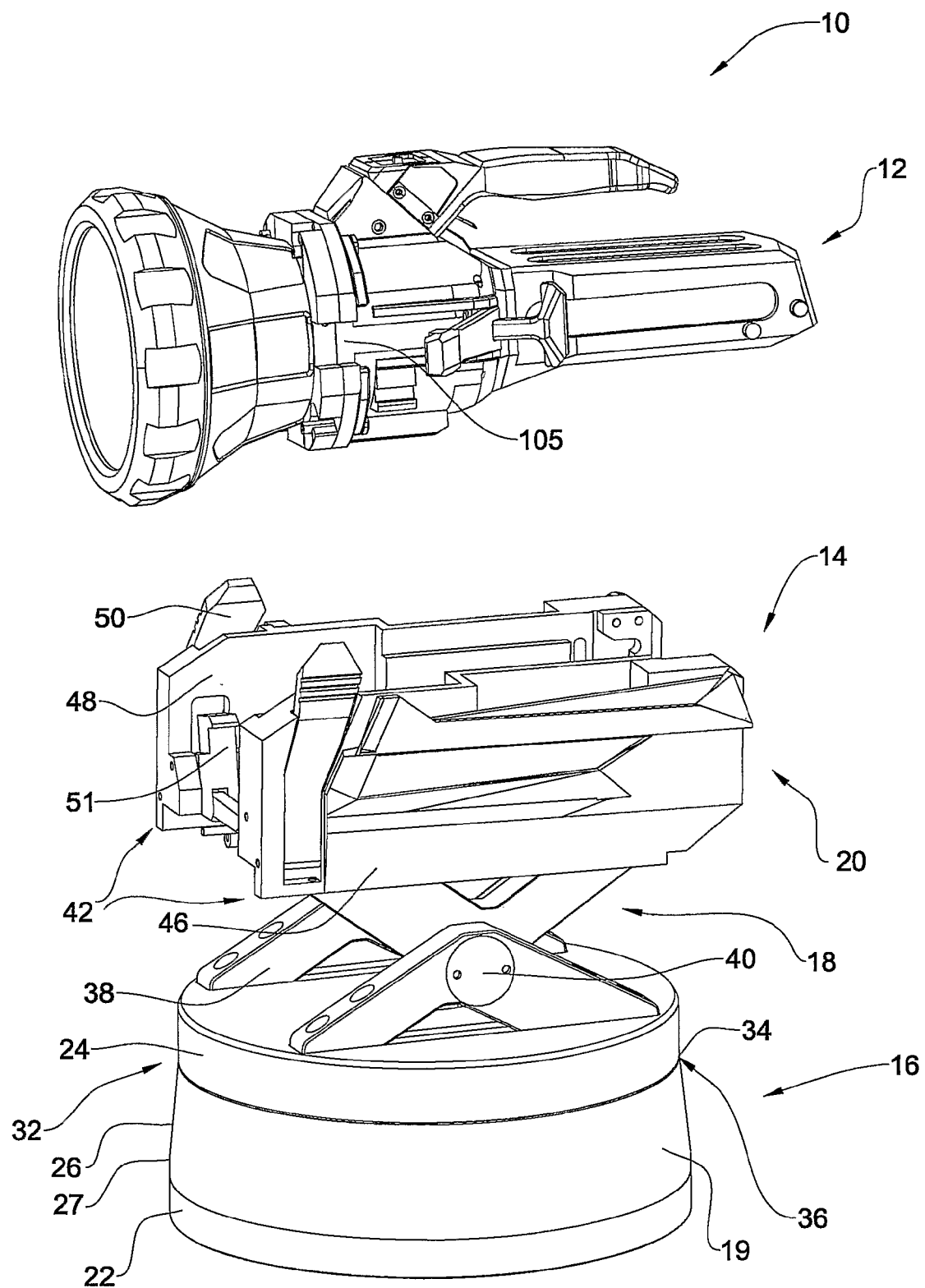
FIG. 1 is a perspective side view of a light source assembly comprising a light source and a base, detached from each other, in accordance with one embodiment of the present invention.

Referring to FIG. 1, there is illustrated a light source assembly 10 comprising a light source 12 and a base 14. The light source 12 is adapted to operate, i.e. to emit a light beam, when mounted on the base 14 and when fully detached from it. In the current example the light source is a high intensity discharge (HID) light source. However it should be appreciated that the light source may be an Xenon Short Arc light source or any other light source suitable for functioning as a searchlight. The base 14 comprises a pan-and-tilt unit 16 and a light source cradle 20 mounted above the pan-and-tilt unit 16. The pan and tilt unit 16 can further be divided into a motor assembly 19 and a tilt mechanism 18 mounted thereon.

The motor assembly 19 comprises a magnetic circular floor 22, a rotatable cover 24 disposed above the circular floor 22, and a cylindrical wall 26 disposed between and engaging the circular floor 22 and the rotatable cover 24. The lower edge 27 of the cylindrical wall has cavities (not shown) formed therein. The circular floor 22 has holes (not shown) formed at positions corresponding to the cavities of the cylindrical wall and is attached to the cylindrical wall 26 by pins (not shown) inserted therethrough. Furthermore, the cylindrical wall 26 has a top portion 32 which has a lower end starting at an inwardly directed shoulder 34 and an upper end forming the shape of an annular lip (not shown). The lower rim 36 of the rotatable cover 24 slidably engages the shoulder 34 allowing rotational motion of the cover 24.

The tilt mechanism 18 is disposed between the rotatable cover 24 of the pan-and-tilt unit 16 and the light source cradle 20, and provides tilting motion to the cradle 20. The tilt mechanism 18 will be described in further detail hereinafter.

The light source cradle 20 is adapted, in this example, to securely hold the light source 12 when it is mounted thereon, and for providing power thereto. The cradle 20 comprises two side walls 42 and a cradle floor 44 all defining therebetween the interior of the cradle 20. Each side wall 42 has an exterior surface 46 and an interior surface 48. Attached to the exterior surface 46 of each side wall 42 is a light source release handle 50. Mounted on the interior of the cradle 20 are two fingers 51 for securing of the light source 12 to the cradle 20. The cradle 20 will be described in further detail hereinafter.

Figure 2:
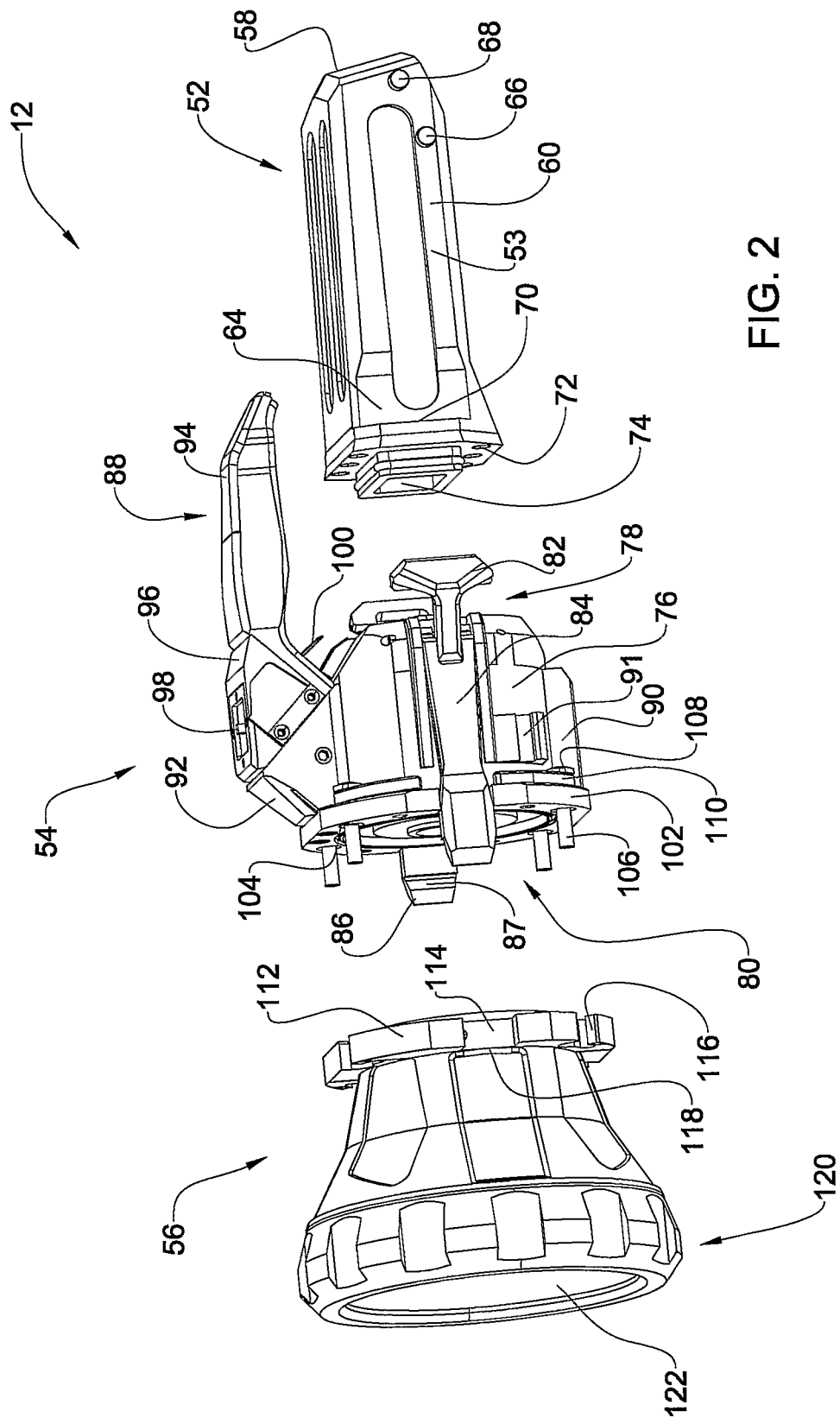
FIG. 2 is an exploded view of the light source shown in FIG. 1, including a light source head, a ballast and igniter unit, and a battery unit.

Turning attention now to FIG. 2, there is illustrated an exploded view of the light source 12, divided into three sections, a battery unit 52, a ballast and igniter unit 54 and a light source head 56.

The battery unit 52 comprises a battery housing 53, a lithium battery (not shown) disposed in the battery housing 53, and an electrical socket assembly 72 attached to the battery housing 53. The battery housing 53 comprises a bottom portion 58, four side portions 60, and an open top end (not shown). Two of the side portions 60 have a recessed area 64 formed therein. Furthermore, there are guide pins 66 and a cylindrical pins 68 protruding from the side portions 60 that have a recessed area 64. The top end (not shown) of the battery unit 52 comprises a peripheral rim 70 and is sealed by an electrical socket assembly 72. The electrical socket assembly 72 has a rectangular opening 74 suitable for insertion of a power plug (not shown) thereto. Furthermore, the lithium battery (not shown) engages the electrical socket 72 receiving or transmitting power the socket assembly 72.

The ballast and igniter unit 54 comprises an intermediate section 76 disposed between a rear end 78 and a front end 80.

The rear end 78 has two T-shaped fasteners 82 pivotally hinged thereto. Engaging each T-shaped fastener 82 is a longitudinally oriented locker 84. The locker 84, is pivotal about a portion of the intermediate section 76 adjacent to the rear end 78, and further comprises a head portion 86. The head portion 86 extends past the front end 80 of the ballast and igniter unit 54 when the locker 84 is aligned thereto. The head portion 86 comprises a transverse rib 87, disposed on the head portion 86, The intermediate section 76 comprises a handle assembly 88 fixed thereto and, in this example, a plug housing portion 90. The intermediate section also has a small depression 91 formed therein for fastening receipt of the fingers 51 of the cradle 20.

The handle assembly 88 comprises a handle base 92 fixed to the intermediate section 76, a handle 94 rotatably mounted to the handle base 92, a handle stopper 96 for restricting and enabling rotation of the handle 94, a power switch 98 mounted on the handle for turning the light source 12 on and off, a trigger button 100 mounted on the handle 94 for changing the light emitting mode of the light source 12. The handle 94 is designed to be strong enough to bear the weight of the light source 12 and may be rotated or swiveled to another position, with respect to the handle base 92, by lifting the handle stopper 96 and applying a rotational force to the handle 94 as will be further discussed hereinafter. Both the power switch 98 and the trigger button 100 are able to control the light source 12 via light source microcontroller (not shown), disposed inside the ballast and igniter unit 54 and connected to the ballast (not shown). The trigger button 100 is adapted to activate a fall power/half power mode and a pulse (flashing) mode, dependent upon the number of times the trigger 100 is squeezed and the length of time for which it is squeezed. It should be noted that while the current light source illustrated has both a power switch 98 and a trigger button 100, other light sources according to the current invention may be designed to have only a single switch/button performing all the above mentioned functions or a plurality of switches performing the same functions. Additionally, other functions, for example, a dimmer function may also be added to the light source 12. The plug housing portion 90 encompasses an electrical socket (not shown) for receiving and providing power, in addition to receiving operational signals, from the base 14. It can also be appreciated that in there may be an alternate light source according to the present invention which is adapted to transmit operational signals to a connected item instead of receiving them.

The front end 80 of the intermediate section 76 comprises a first annular rim 102 having longitudinal holes 104 and two central recesses 105 (see FIG. 1) formed therein. Threaded pins 106 are inserted through the longitudinal holes 104 and engage a bolt 108 and a rotatable locker 108 which are pivoted to secure the threaded pin 106 to the first annular rim 102. Each central recess 105 is adapted to accommodate the head portion 86 of the locker 84 when it is aligned with the ballast and igniter unit 54.

The light source head 56 comprises, a bulb 124 (FIG. 3A) and a reflector 126 (FIG. 3A), a lens housing 120, a lens 122 and a second annular rim 112. The second annular rim 112 comprises two locker recesses 114 and a plurality of slots 116 which, respectively, correspond to the positions of the central recesses 105 and the longitudinal holes 104 of the first annular rim. Each locker recess comprises a transverse edge 118 and is adapted to accommodate the head portion 86 of the locker 84 when it is aligned with the ballast and igniter unit 54, and the light source head 56 is engaging the front end 80 of the intermediate section 76. When this is the case, the engagement of the transverse rib 87 and the locker recess 114 causes the intermediate section 76 and the light source head 56 to be fastened together. The threaded pins 106 are slotted into the slots 116 and are fastened to the second annular rim 112 by bolts (not shown), this is done in addition to the locker 84 fastening to ensure that the two sections are securely fastened. It should be noted that the fastening of the light source head 56 to the ballast and igniter unit 54 is done in such a way so as to enable alternative light source heads (not shown) to be secured to the igniter unit 54.

Figure 3A:
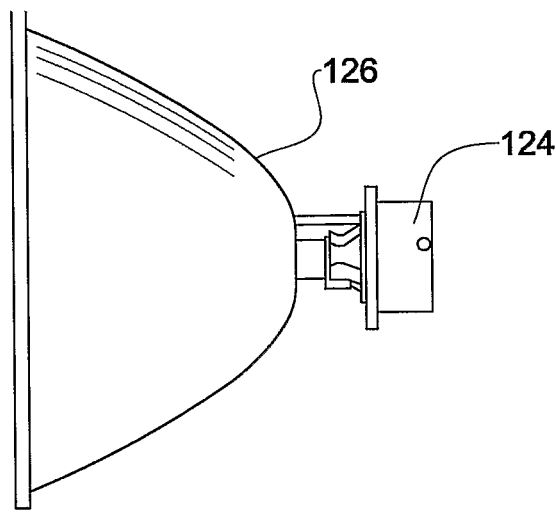
FIGS. 3A and 3B are respectively side and front views of a reflector and a light bulb constituting the light source head shown in FIG. 2.
Figure 3B:
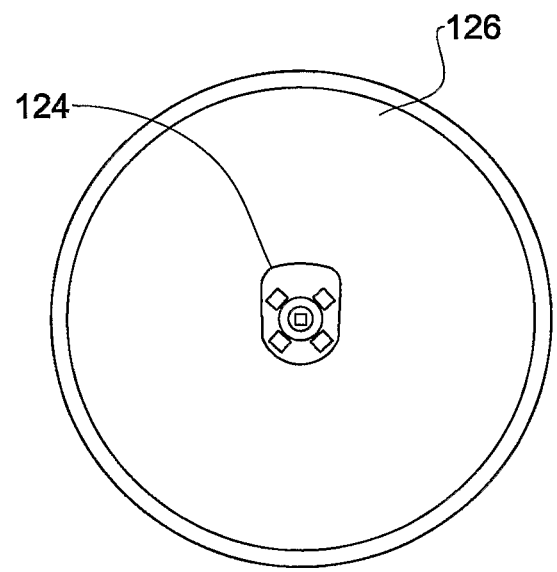
Figure 3C:
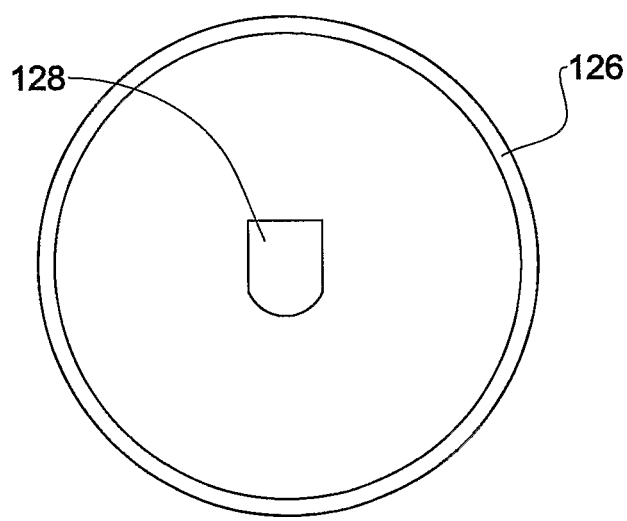
FIG. 3C is a front view of the reflector shown in FIGS. 3A and 3B.

Turning attention now to FIGS. 3A, 3B and 3C, the bulb 124 can be seen mounted in the reflector 126. The bulb 124 used, in this example, is a Phillips DL50. The DL50 has a non-circular circumferential shape and the reflector's aperture 128, through which the bulb is inserted, has a D-shaped cut-out to maximize the use of the light emitted from the bulb 124.

Figure 3D:
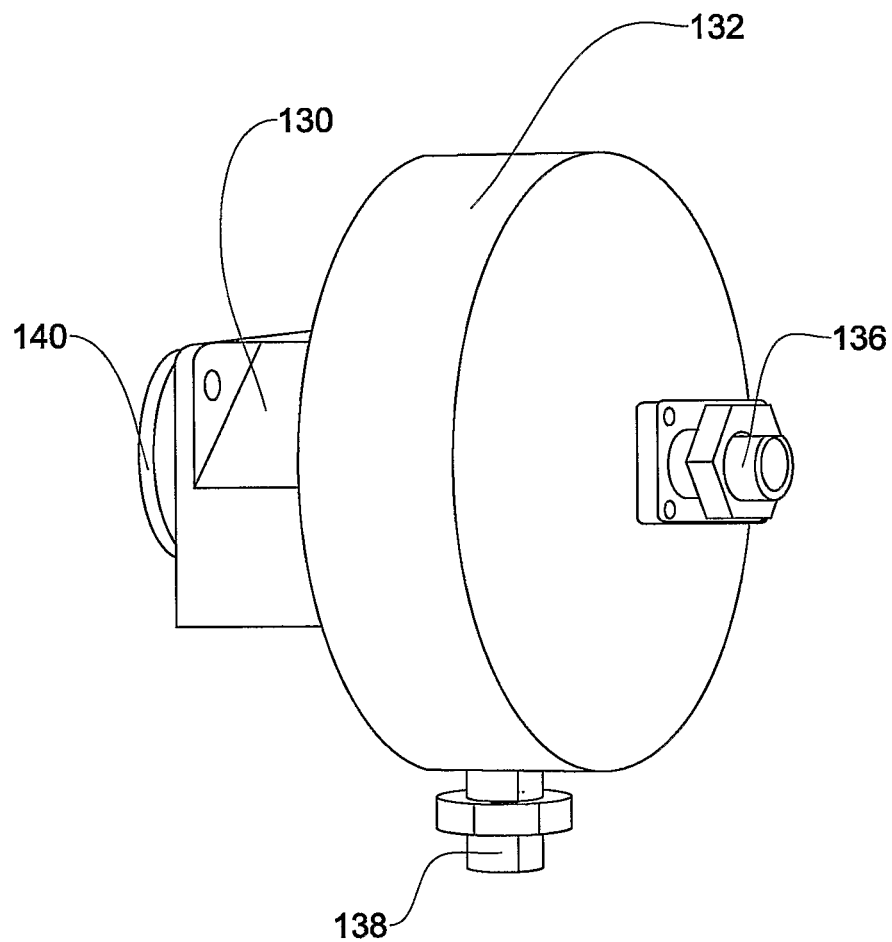
FIG. 3D is a schematic side view of a part of the ballast and igniter unit shown in FIG. 2.

Turning now to FIG. 3D, illustrated are selected elements of the light source 12, namely, an igniter 130, a ballast 132 which is engaged to the igniter 130, a horizontal electrical connector 136 connected at one end to the ballast 132 and when assembled to the electrical socket assembly 72 (FIG. 2) and adapted for providing power therebetween, and a vertical electrical and control connector 138 connected between the ballast 132 and when assembled to the base 14 (FIG. 1) adapted for providing power and control therebetween. The igniter 130 further comprises a bulb socket 140 within which the bulb 124 (FIG. 3A) is mounted, when the light source 12 is assembled. The operation of the above described selected elements will be discussed hereinafter.

Figure 4A:
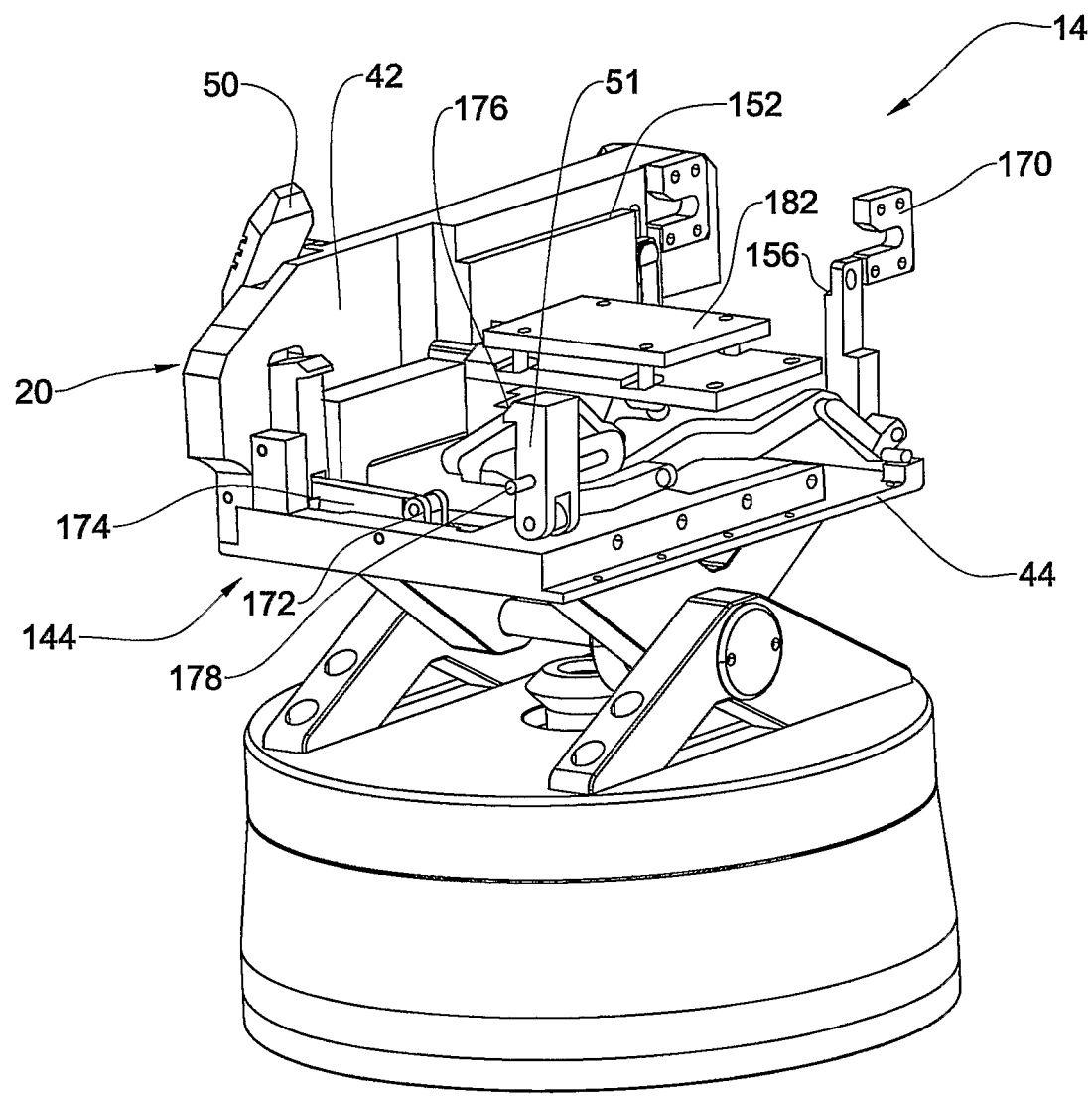
FIG. 4A is a perspective view of the base shown in FIG. 1 with some portions of its cradle removed to facilitate a view of its internal elements.

Referring now to FIG. 4A, there is shown a light source cradle 20 comprising a cradle floor 44, a side wall 42, a protecting assembly 142, a securing assembly 144, and a release handle 50. It should be noted that one of the side walls 42 has been removed to facilitate understanding of the cradle 20 construction.

Figure 4B:
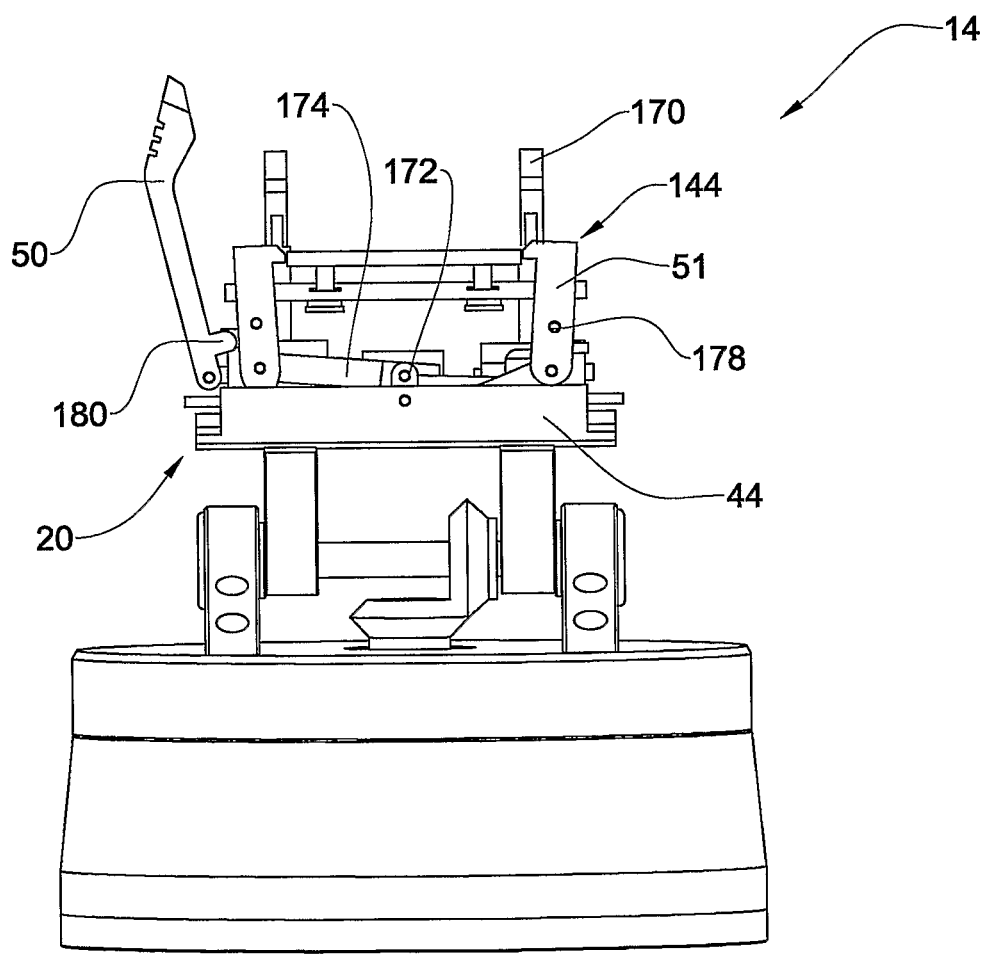
FIG. 4B is a front view of the base shown in FIG. 4A with more portions of the cradle removed.
Figure 4C:
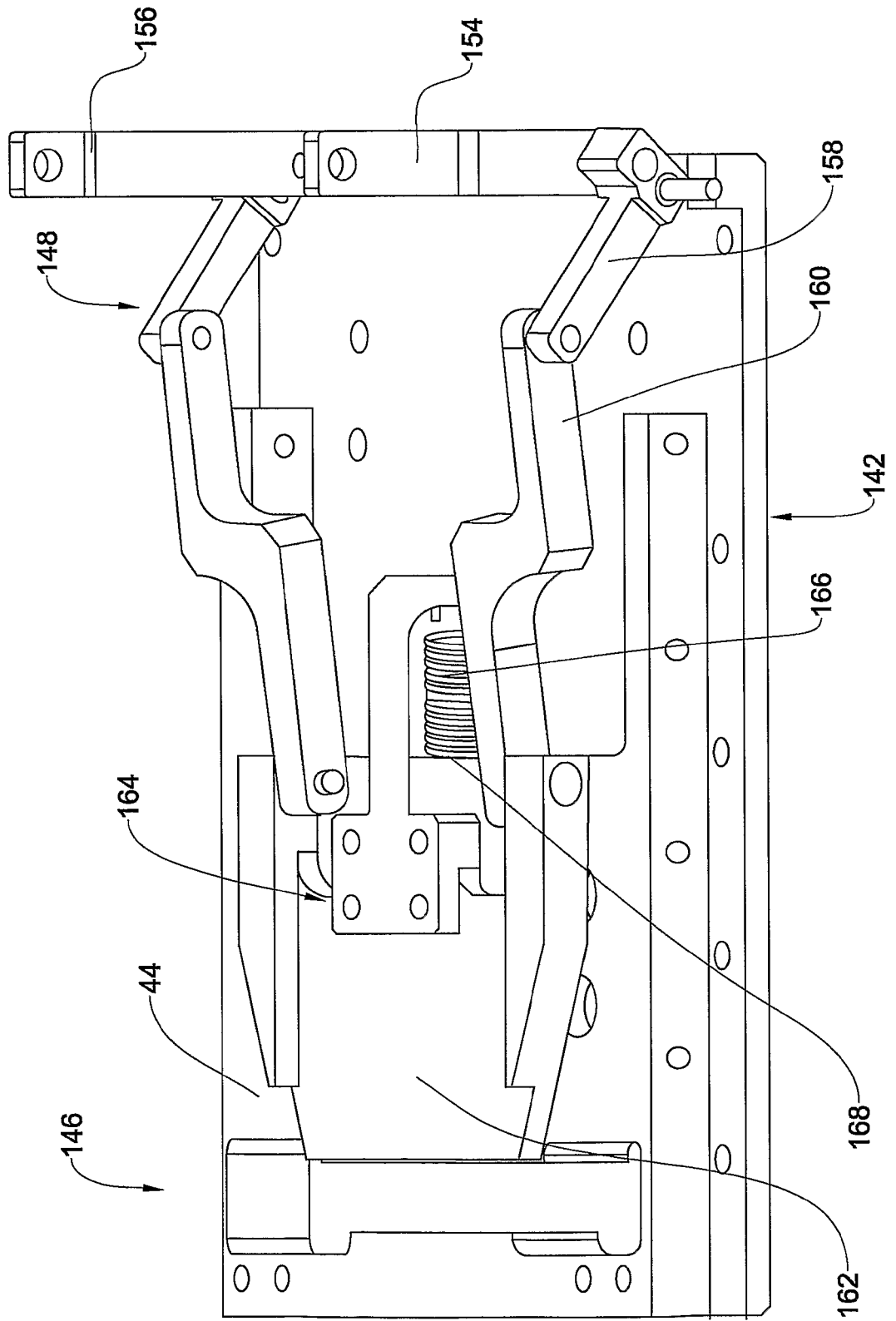
FIGS. 4C and 4D are perspective views of a cradle floor of the base shown in FIGS. 1, 4A and 4B, respectively with and without a protecting assembly.
Figure 4D:
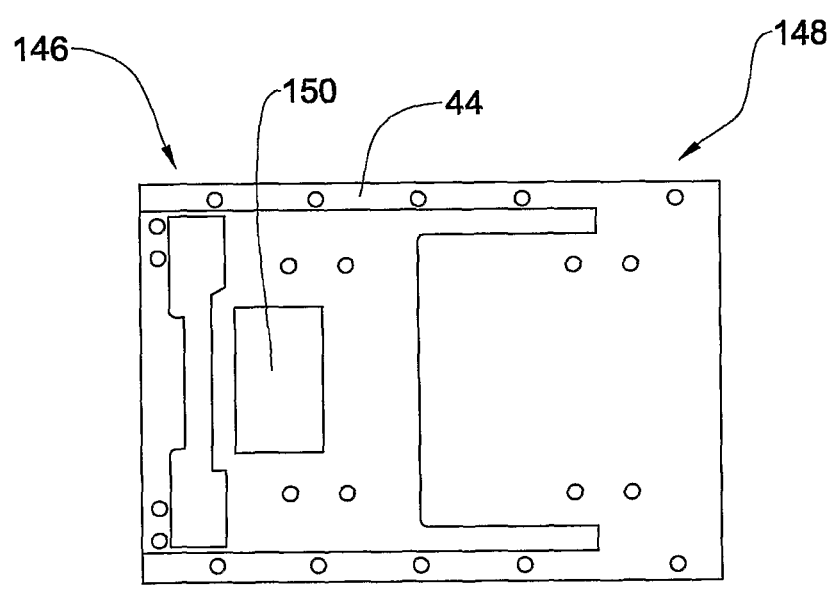

Referring briefly to FIG. 4D the cradle floor 44 can be seen to have a front portion 146, a rear portion 148, and a rectangular opening 150 formed therein. The rectangular opening 150 is adapted to have an electrical connector (not shown) mounted therein. The electrical connector (not shown) is connectable to an external power source (not shown).

Reverting to FIG. 4A, it should be noted that the interior surface 48 of the side wall 42 has a longitudinal projection 152.

Referring now to FIG. 4C, the protecting assembly 142 comprises a vertical rod 154 having an L-shaped recess 156 (also seen in FIG. 4A) formed at a top end thereof. The vertical rod 154 is further pivotally attached to an L-shaped rod 158. The L-shaped rod 158 is pivotally attached to a substantially horizontal rod 160. The horizontal rod 160 is pivotally attached to a shutter element 162. The shutter element 162 is fixed to a return element 164. The return element 164 engages a compression spring 166 fixed to the cradle floor 44 a point 168 and the shutter element 162 at the other. The spring 166 is designed to normally bias the shutter element 162 towards the front portion 146 of the cradle floor 44.

Reverting to FIGS. 4A and 4B, the securing assembly comprises a U-shaped end locker 170, a spacer 172 pivotally mounted to a front portion 146 of the cradle floor 44, two spacer rods 174 each connected to an alternate end of the spacer 172, fingers 51 engaging the spacer rods 174 each having an internally facing tooth-like projection 176 and each being pivotable about a middle point 178.

The release handle 50 is sent to be pivotally mounted to the cradle floor 44 and has a curved projection 180 engaging the fingers 51.

The cradle 20 further comprises a heating element 182 mounted therein powered by whichever external power source the base may be connected to.

During mounting of the light source 12 to the base 14, the light source 12 is positioned above the base 14 as seen in FIG. 1. The light source 12 is then lowered into the cradle 20 until the guide pin 66 contacts the longitudinal projection 152. The light source 12 is then moved rearward until the cylindrical pin 68 is trapped by the U-shaped end locker 170. The light source 12 is then lowered into the cradle, with the guide pin 66 resting on the L-shaped recess 156 and forcing the vertical rod 154 downwards. The downwards movement of the vertical rod causes the shuttle element 166 to move towards the rear portion 148 of the cradle floor 44, uncovering the rectangular opening 150 and allowing the electrical connector (not shown) mounted therein to engage the vertical connector 138 of the light source 12. The lowering of the ballast and igniter unit 54 rotates the vertically oriented spacer 172 to a horizontal position, pivoting the fingers 51 inwardly so that the tooth-like projections 176 engage the small depressions 91 on the ballast and igniter unit 54, thereby locking the light source 12 into position and pivoting the top of the release handle 50 further from the exterior surface 46 of the side wall 42.

During detachment of the light source 12 from the base 14, either release handle 50 may be squeezed toward the side wall 42, the fingers 51 are pivoted outwardly rotating the spacer to a vertical position. The light source 12 may then be lifted by the handle 94. As the guide pin 66 is removed from the L-shaped recess 156 the spring 166 thrusts the shutter element 162 over the rectangular opening 150, protecting the electrical element (not shown) mounted therein from exposure to the environment. It should be mentioned, that the protective design of the light source assembly 10 enables it to have an ingress protection level of 65 (IP65 rating).

Figure 5:
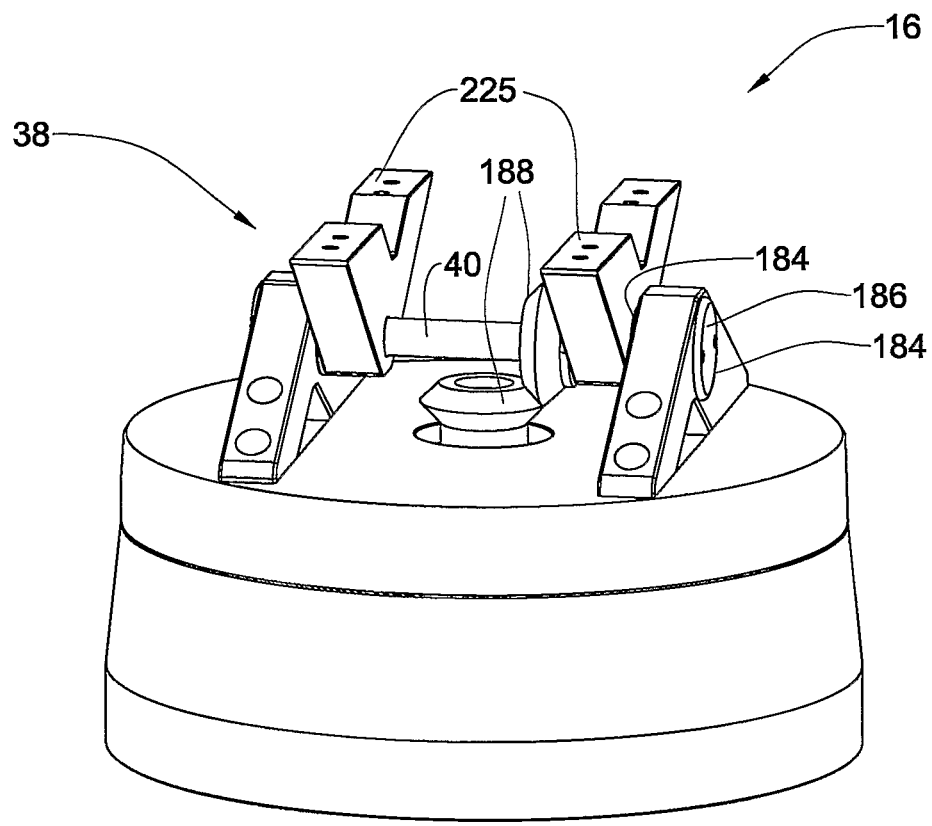
FIG. 5 is a schematic view of a pan-and-tilt unit of the base shown in FIGS. 1, 4A and 4B.
Figure 6:
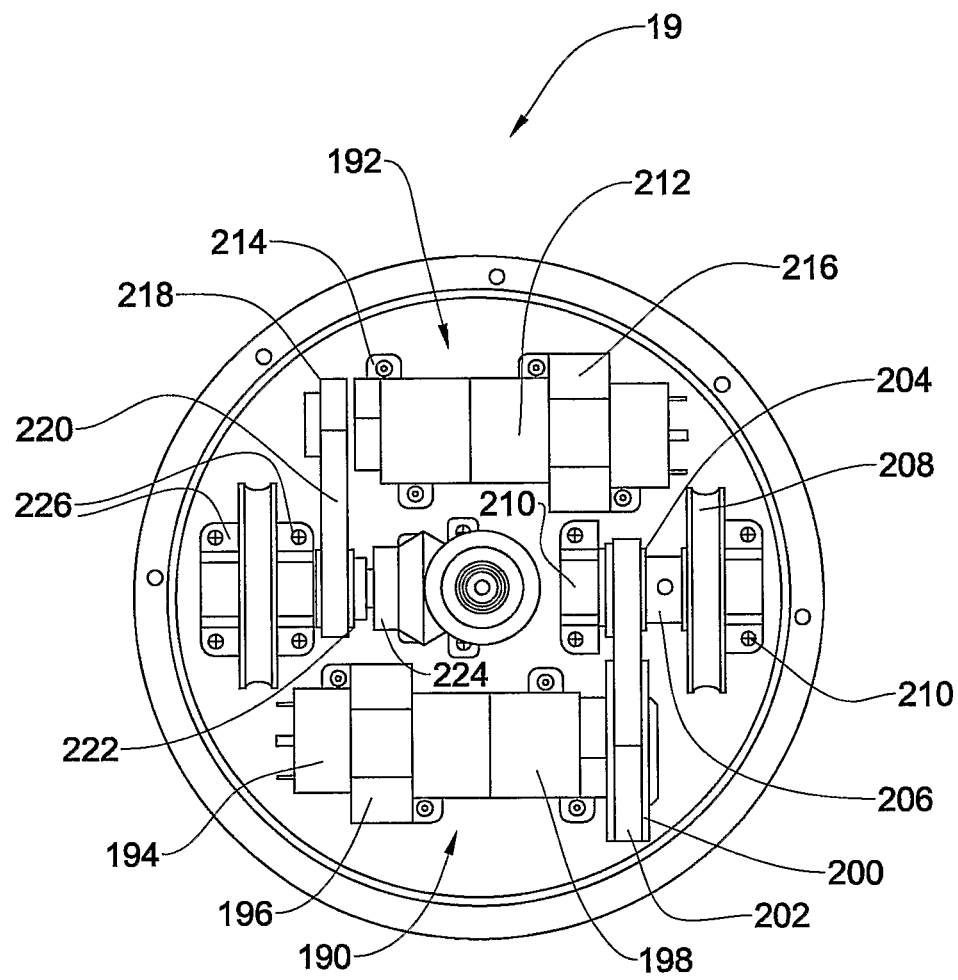
FIG. 6 is a top view of a motor assembly of the pan-and-tilt unit shown in FIG. 5.

Referring now to FIGS. 5 and 6, the cradle is able be oriented in a plurality of position by the pan-and-tilt unit 16. The pan-and-tilt unit 16 is controlled by a wireless remote control system (not shown) as known in the prior art, for example from U.S. Pat. No. 5,673,989. However it should be noted that the pan-and-tilt mechanism may be electronically controlled, for example, by a joystick (not shown) attached by a cable.

The tilt mechanism 18, of the pan-and-tilt unit 16, is mounted atop the rotatable cover 24 of the pan-and-tilt unit 16 and comprises four V-shaped support members 38 each have a central aperture 184 at their base, a shaft 40 inserted through the central apertures 184, and a shaft cover and sleeve 186 mounted at each end of the shaft to prevent non-rotational motion of the V-shaped support members 38. The shaft 40 is connected to a first bevel gear assembly 188 which is driven by the motor assembly 19.

The motor assembly 19 comprises a first motor assembly 190 and a second motor assembly 192. The first motor assembly 190 comprises a first motor 194. The first motor 194 is supported by a first support bracket 196 and a second support bracket 198. The motor 194 further engages a first timing wheel 200 which is adapted to be rotated by the motor 194. The first timing wheel 200 is encircled by a first belt 202. The first belt 202 also encircles a second timing wheel 204, which is inline with the first timing wheel 200. The second timing wheel 204 engages a rotatable spacer 206. The spacer 206 engages a rotatable contact wheel 208. The contact wheel 208 engages the cover 24 (FIG. 1). Additionally, the second timing wheel 204, spacer 206 and contact wheel 208 are supported in position, without impeding rotational motional thereof, by a first pair of mounting brackets 210 which are fixed to the circular floor 22 by screws (not shown) or like means.

During operation of the first motor assembly 190, the motor 194 is activated rotating the first timing wheel 200 which in turn rotates the first belt 202, second timing wheel 204, rotatable spacer 206 and contact wheel 208. The rotation of the contact wheel against the cover 24 causes it to rotate, thereby panning the cradle 20 positioned above. It should be noted a second contact wheel 210 is used to further facilitate motion of the cover 24.

The second motor assembly 192 comprises a second motor 212. The second motor 212 is supported by a third support bracket 214 and a third support bracket 216. The second motor 212 further engages a third timing wheel 218 which is adapted to be rotated by the second motor 212. The third timing wheel 218 is encircled by a second belt 220. The second belt 220 also encircles a fourth timing wheel 222, which is inline with the third timing wheel 218. The fourth timing wheel 222 rotatably engages a second bevel gear assembly 224. Additionally, the fourth timing wheel 222 is supported in position, without impeding rotational motional thereof, by a second pair of mounting brackets 226 which are fixed to the circular floor 22 by screws (not shown).

During operation of the second motor assembly 190, the second motor 212 is activated rotating the third timing wheel 218 which in turn rotates the second belt 220, and fourth timing wheel 222. The rotation of the fourth timing wheel rotates the second bevel gear assembly 224, thereby rotating the first bevel gear assembly 188 and the shaft 40. The rotation of the shaft 40 causes the upright V-shaped support members 225 (only one shown in the current view) to tilt, thereby tilting the cradle 20 (FIG. 1) disposed thereon.

The pan-and-tilt unit 16 described above uses a friction based system for palming. Friction systems are generally more durable than gears especially during motion of vehicle across bumpy surfaces. The use of the friction system also facilitates use of a lower base than would be used with a gear assembly.

Figure 7:
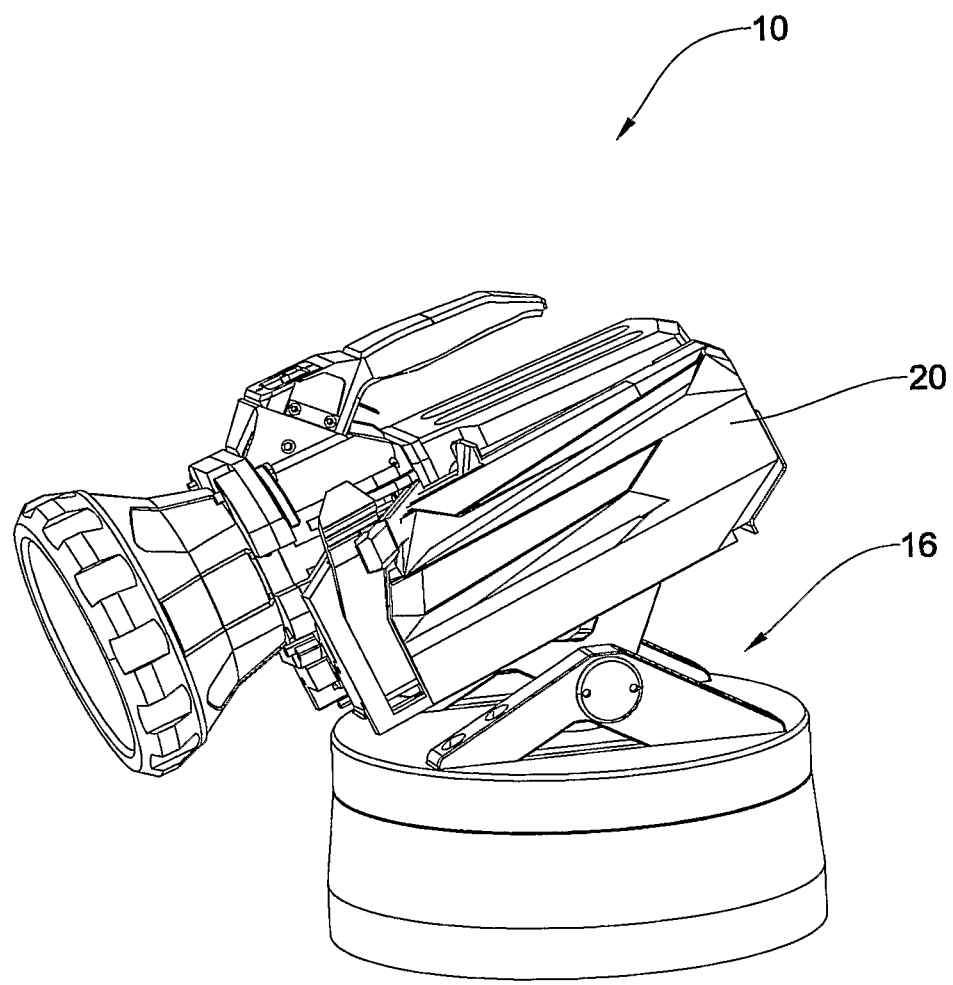
FIG. 7 is a perspective side view of the light source assembly shown in FIG. 1, with the light source mounted on the base.

In FIG. 7 the light source assembly is shown assembled. The electrical arrangement between the light source 12 and the base 14 will be discussed hereinafter. It should be noted that the light source 12 is held firmly in the cradle 20 allowing the pan-and-tilt unit 16 to operate without the light source 12 changing position with respect to the cradle 20.

Figure 8:
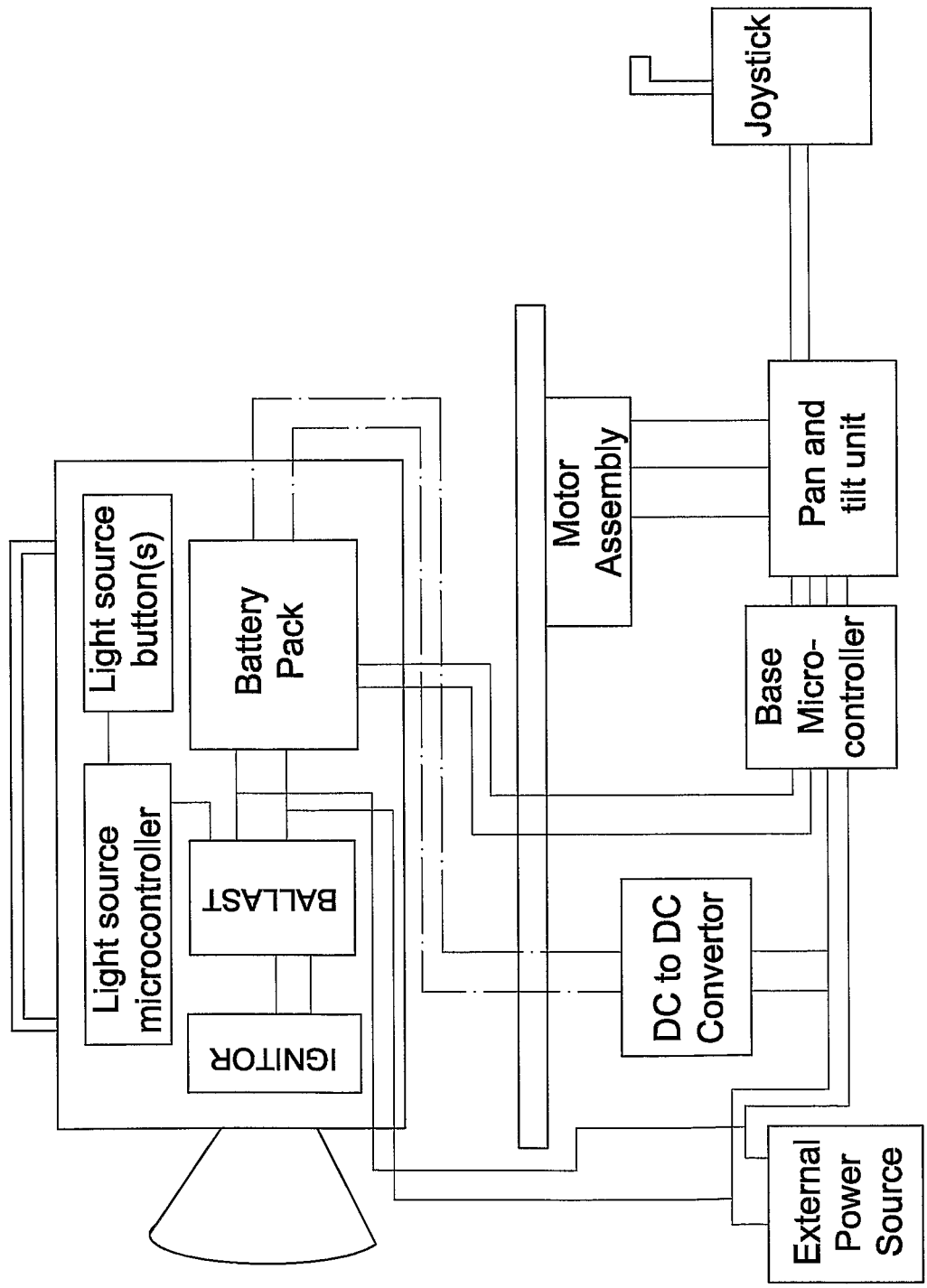
FIG. 8 is a schematic block diagram of electrical arrangements for the light source assembly, shown in FIG. 7 and an external power source.

Referring now to FIG. 8, a schematic block diagram of electrical arrangements for the light source assembly is shown. To facilitate the electrical arrangements represented in FIG. 8, the light source assembly 10 further comprises a base microcontroller mounted in the base, a transformer controlled by the base microcontroller, and a light source microcontroller.

The base microcontroller having a charging circuit adapted to operate at a first voltage rate, a feeding circuit adapted to operate at a second voltage rate, a switch for selecting between the charging circuit and feeding circuit, and a transformer to provide power to the charging and feeding circuits at the first voltage rate and the second voltage rate, respectively.

The base microcontroller is adapted to facilitate any of the following operations:
  the lithium battery (not shown) to provide power to the bulb 124 via the horizontal connector 136, ballast 132 and igniter 130, thereby illuminating the bulb 124 and subsequently emitting a beam of light from the light source 12;
  the lithium battery (not shown) to provide power to the base 14 (FIG. 1) via the horizontal connector 136, ballast 132 and vertical connector 138, for purposes which will be discussed hereinafter;
  the base 14 (FIG. 1), when connected to an external power source (not shown), to provide power to the battery (not shown) via the transformer, the vertical connector 138, ballast 132 and horizontal connector 136, thus charging the battery utilizing the charging circuit; and
  the base 14, when connected to an external power source (not shown) may provide power directly to the bulb 124 via the igniter 130, ballast 132 and vertical connector 138, utilizing the feeding circuit, thereby illuminating the bulb 124 and subsequently emitting a beam of light from the light source 12.

The light source microcontroller is adapted to facilitate any of the functions described above with respect to the power switch 98 and the trigger button 100.

Additionally, it should be noted that the above-described motor assembly 19 design incorporates bevel gears which tilt the cradle when the cradle 20 is panned by the first motor 194, to compensate for this undesired tilting the base microcontroller activates the second motor 212 to counter the undesired tilting by providing suitable tilting motion in the reverse direction.

Turning attention to FIG. 9, a vehicle 250 is shown with a light source assembly 10 is mounted thereon. The light source assembly 10 is seated in a mounting plate 252 which is fixed to an external portion 258 of the vehicle 250. In this case the external portion 258 is the roof of the vehicle 250. The view of the light source assembly 10 is somewhat obstructed by the high rim 254 of the mounting plate 252.

Turning now to FIG. 10, the top view of the mounting plate 252 shows a magnetic floor 251 having a plurality of apertures 256. The magnetic floor 251 is encircled by a high rim 254.

The mounting plate 252 may be fixed to the vehicle 250 by creating appropriate apertures in the vehicle 250 roof and bolting the mounting plate, via the apertures 256, to the vehicle 250. The light source assembly 10 may be inserted and removed from the mounting plate 252 by an upwards or downwards motion. The magnetic floor 251 and magnetic circular floor 22 are adapted to prevent unwanted attachment from the vehicle during motion. The high rim 254 is designed to prevent side motion of the light source assembly 10 when mounted on the mounting plate 252.

It should be noted that any shape or type of mounting plate 252 may be used that will secure the light source assembly 10 to the vehicle during motion, whether magnetic, suction, mechanical etc.

Referring now to FIG. 11, the light source assembly 10 is shown mounted on a tripod 260 without a mounting plate 252. The light source assembly 10 is powered by a wall power outlet 264, disposed in a wall 261. The light source assembly 10 is further connected to a video camera 268 which is part of a closed-circuit television (CCTV) system. The light source assembly 10 is adapted to receive control signals from the camera 268 for the base to move the light source in accordance with the signals, orienting the light source in the same direction as the camera 268.

Figure 12:
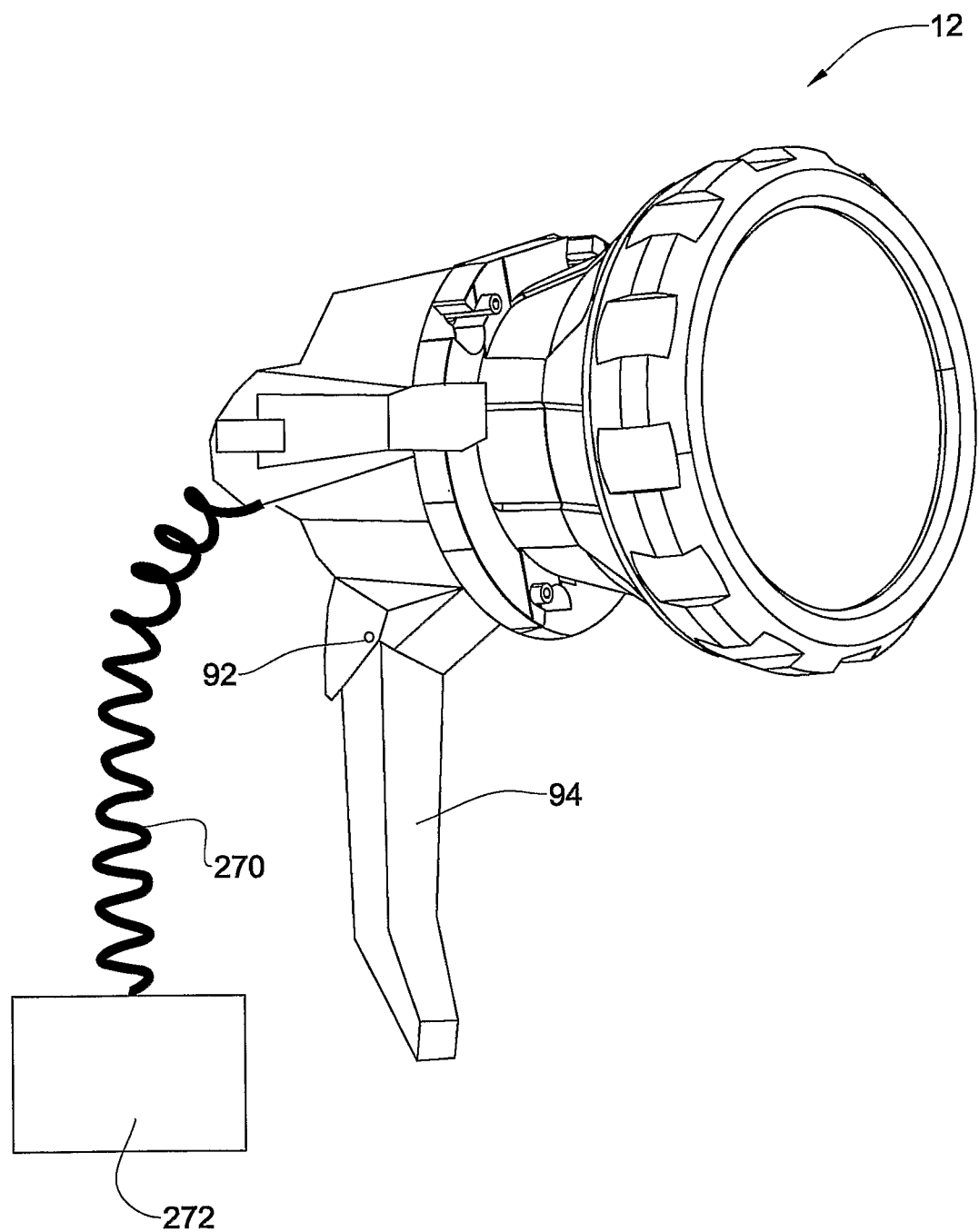
FIG. 12 illustrates an alternative mode of operation of the light source shown in FIG. 1.

FIG. 12 illustrates the light source 12 with the handle 94 rotated or swiveled with respect to the handle base 92 as described above. The light source 12 further comprises a cord 270 for connecting the battery 272 to the light source 12. The battery may then be placed in a person's pocket, for example, while still providing power to the light source 12.

Those skilled in the art to which this invention pertains will readily appreciate that numerous changes, variations and modifications can be made without departing from the scope of the invention mutatis mutandis.

The invention claimed is:

1. A light source assembly including a light source and a base to which the light source is detachably attachable, the base being configured to orient the light source to a plurality of positions when the light source is mounted thereon, the light source being a searchlight configured to search for distant items and to be operational both when mounted on the base and when disconnected from the base, the light source comprising a battery mounted therein or connected thereto, for providing power to the light source at least when the light source is disconnected from the base, the base being further configured for being powered by said battery and/or by an alternative power source, wherein the base is configured for being powered by said battery to move the light source into said plurality of positions, at least when the light source assembly is disconnected from the alternative power source.

2. A light source assembly according to claim 1, wherein the base is configured to pan the light source.

3. A light source assembly according to claim 1, wherein the base is configured to tilt the light source.

4. A light source assembly according to claim 1, wherein the base comprises a pan and tilt unit configured to orient the light source to the plurality of positions.

5. A light source assembly according to claim 1, wherein the base comprises a motor assembly configured to orient of the light source to the plurality of positions.

6. A light source assembly according to claim 1, further including a mounting plate, wherein said base is configured for being detachably attachable to said plate.

7. A light source assembly according to claim 6, further including a base locking mechanism to lock the base in its position on the mounting plate.

8. A light source assembly according to claim 1, further including a light source locking mechanism, to lock the light source in its position on the base.

9. A light source assembly according to claim 6, wherein the mounting plate is configured for mounting on a vehicle and the base is configured for being powered by a power source of a vehicle.

10. A light source assembly according to claim 1, wherein said light source assembly has an arrangement for the battery in the light source to be charged by an external power source.

11. A light source assembly according to claim 10, further comprising a charging circuit with a socket for receiving power from the external power source, the socket being disposed either in the base or in the light source and being provided with a protecting assembly to allow its protection from the environment when the light source assembly is disconnected from the external power source.

12. A light source assembly according to claim 1, further comprising a feeding circuit to power the light source assembly directly from the alternative power source, without the use of the battery.

13. A light source assembly according to claim 1, further comprising a charging and a feeding powering circuit via which the battery and the light source assembly, respectively, may be powered, and a switch to selectively power said battery and said assembly via said circuits.

14. A light source assembly according to claim 13, further comprising a transformer to provide to the charging and feeding circuits different voltages, as needed.

15. A light source assembly according to claim 1, further configured for use with a video camera, and having input to receive control signals from said camera for the base to move the light source in accordance with said signals, in particular, to orient the light source in the same direction as the camera.

16. A light source assembly according to claim 1, wherein the light source is a HID (high intensity discharge) source or a Xenon Short Arc source.

17. A light source assembly according to claim 1, wherein said light source includes a reflector with an aperture and a light bulb mounted in the aperture, and wherein the light bulb has a non-circular circumferential shape and the reflector's aperture has a shape to suit that of the bulb.

18. A light source assembly according to claim 1, wherein the battery in the light source assembly is a lithium battery and the light source assembly further includes a heating element disposed adjacent to said battery.

19. A light source assembly according to claim 6, configured for remote control both when mounted on the mounting plate, and when detached therefrom.

20. A light source assembly according to claim 1, wherein the base further comprises a motor assembly and an input device disposed externally to the base for control of the movement of the base.

21. A light source assembly according to claim 20, wherein the input device is a joystick or like means comprising a wireless transmitter by which it transmits signals to the base for control thereof, said base further comprising a receiver mounted thereon for receiving the signals from the wireless transmitter.

22. A light source assembly according to claim 20, wherein the input device is a joystick or like means comprising a cable, connected to the base for control thereof.

23. A light source assembly according to claim 1, wherein the base is configured to be powered by a primary source and a secondary source and further comprises a microcontroller embedded therein; the microcontroller being configured to direct power from the primary source to the base, and to detect if power from the primary source is not available, to reroute power to the base from the secondary source if power from the primary source is not available.

24. A light source assembly according to claim 1, wherein said light source includes a handle configured for carrying the light source alone or when locked to the base.

25. A light source assembly according to claim 1, wherein the base and light source have an ingress protection level of 65 (IP65).

26. A light source assembly according to claim 1, wherein the light source comprises a D-shaped bulb and a reflector with a D-shaped cut out through which the bulb is inserted.

* * * * *